United States Patent [19]

Sato et al.

[11] 4,200,177

[45] Apr. 29, 1980

[54] DRIVING MECHANISM FOR DRIVING MOVING HANDRAIL

[75] Inventors: Yoshihiko Sato, Katsuta; Masayuki Kubota, Nakaminato, both of Japan

[73] Assignee: Hitachi, Ltd., Japan

[21] Appl. No.: 839,448

[22] Filed: Oct. 5, 1977

[30] Foreign Application Priority Data

Oct. 13, 1976 [JP] Japan ........................ 51-121888
Oct. 20, 1976 [JP] Japan ........................ 51-124846

[51] Int. Cl.$^2$ ........................ B65G 15/00

[52] U.S. Cl. ........................ 198/335; 198/835; 226/186

[58] Field of Search ........................ 198/835, 834, 842, 335; 74/219, 221; 198/624; 226/181, 186

[56] References Cited

U.S. PATENT DOCUMENTS 3,331,488 7/1967 Wellman ........................ 198/624
3,666,075 5/1972 Iwata ........................ 198/335
3,779,360 12/1973 Taher et al. ........................ 198/835

FOREIGN PATENT DOCUMENTS 2419097 10/1975 Fed. Rep. of Germany ........... 198/835

*Primary Examiner*—Robert B. Reeves
*Assistant Examiner*—Douglas D. Watts
*Attorney, Agent, or Firm*—Craig & Antonelli

[57] ABSTRACT

A driving mechanism for driving a moving handrail of an escalator and the like. The driving mechanism include driving rollers and guiding rollers which are disposed to confront with each other through the moving handrail interposed therebetween. The driving rollers are secured to a movable plate, while the guiding rollers are attached to fixed plates. The movable plate is adapted to be moved in the direction perpendicular to the moving handrail, while the fixed plates are firmly secured to a part of a truss frame which supports the escalator. The movable plate carries a sprocket by means of which the driving rollers are rotated to drive the moving handrail. The sprocket itself is adapted to be driven by a chain going therearound. The vertical component of the tensile force residing in the chain acts to press the driving rollers onto the moving handrail.

24 Claims, 9 Drawing Figures

DRIVING MECHANISM FOR DRIVING MOVING HANDRAIL

BACKGROUND OF THE INVENTION

The present invention relates to a driving mechanism for movable handrails of escalators and other movable paths.

In general, the handrails of escalators and other movable paths are driven by means of frictional force. Therefore, it is necessary to keep a strong frictional engagement between driving rollers and the movable handrails. For instance, such a driving mechanism is known which has a spring means for biasing the movable handrails into a stronger engagement with the driving rollers. This driving mechanism is however inconvenient in that indentations tend to be formed in the surface of the handrails, during the suspension of the moving path, by means of driving rollers and guide rollers between which the handrails are clamped.

Various driving mechanisms have been proposed which are intended for overcome the above described drawback. For instance, Japanese Publication of Utility Model Application No. 50-30796 discloses a driving mechanism constructed to avoid the above stated drawback. This mechanism has a plurality of driving rollers and a plurality of guide rollers which are arranged at front and back sides of the handrails to clamp the latter. The driving rollers are disposed on sprockets coaxially for a simultaneous rotation therewith. These sprockets are adapted to be driven by a motor through a chain. These driving and guiding rollers are rotatably secured to respective frames which are connected mechanically in series by means of pins and grooves, so as to be moved along with the handrails. The pin-and-groove engagement allows the frames of the guiding rollers to move in a direction perpendicular to the handrails. The frame of the guiding roller is provided with a wheel and a V-shaped cam so that the frame may be lifted up as it performs a parallel movement. In operation, as the power of the motor is transmitted to the sprockets through the chain, the frames of the driving rollers and guiding rollers are moved in parallel with each other. Consequently, the frames of the guiding rollers are raised to lift the guide rollers and thereby press the handrails onto the driving rollers, so that a sufficiently strong frictional engagement is established between the handrails and the driving rollers to enable the latter to drive the handrails in a stable manner. However, even this driving mechanism suffers from the following drawbacks.

For the first point, this mechanism is too complicated. In addition, since the frames of the driving rollers are adapted to move in parallel, the chain is often loosened during, for example, suspension of the moving path. Due to this loosening, the chain is apt to get out of engagement with the sprockets when the moving path is restarted. Moreover, in this driving mechanism, considerably large forces are exerted between the pins and associated grooves, and between the wheels and the V-shaped cams, so as to cause a rapid wear at these parts and the mechanism becomes unable to work after a long time of use.

Other relevant prior art is as follows:

(1) Japanese Publication of Utility Model Application No. 51-28797(1976) entitled "DRIVING MECHANISM FOR HANDRAILS IN ESCALATORS AND THE LIKE"

(2) Japanese Publication of Utility Model Application No. 51-49747(1976) entitled "DRIVING MECHANISM FOR HANDRAILS"

These two publications are modifications of the above stated driving mechanism.

(3) Japanese Publication of Utility Model Application No. 51-27592(1976) entitled "DRIVING MECHANISM FOR HANDRAILS". This discloses a driving mechanism in which guide rollers are pressed onto the driving roller by means of electromagnetic force.

SUMMARY OF THE INVENTION

It is, therefore, an object of the invention to provide a mechanism for driving handrails of escalators and moving paths having a simplified construction.

It is another object of the invention to provide a driving mechanism for handrails which is free from above stated drawbacks inherent in the prior art.

To these ends, according to the invention, there is provided a driving mechanism comprising: a frame structure adapted to support said handrails; guiding rollers firmly secured to said frame structure and movably carrying said movable handrails; driving rollers adapted to drive said handrails by means of friction, said driving rollers being disposed at the opposite side of said handrails to drive said guiding rollers and adapted to be moved in the direction perpendicular to said handrails; and transmission means adapted to transmit a driving power to said driving roller; whereby said driving rollers are biased toward said handrails by the tensile force generated in said transmission means as the latter transmit the power to said driving rollers.

These and other objects, as well as advantageous features of the invention will become clear from the following description of the preferred embodiments taken in conjunction with the attached drawings.

DETAILED DESCRIPTION OF THE PREFERRED EMBODIMENTS

Figure 1:
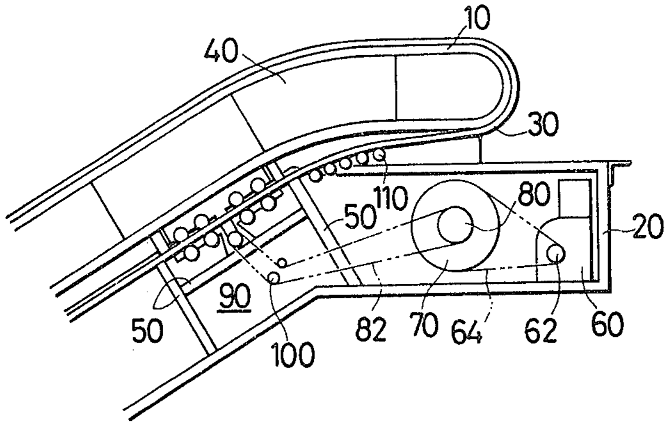
FIG. 1 is a schematic illustration of an escalator incorporating a handrail-driving mechanism embodying the present invention.

Referring at first to FIG. 1, a supporting structure 10 for the moving handrail is firmly mounted on a truss frame 20. The supporting structure has a guide around which goes an endless movable handrail 30. Reference numeral 40 denotes a transparent side board of a balustrade secured to a side of the supporting structure 10, while numeral 50 denotes supporting members for the truss frame 20.

The truss frame 20 firmly houses a motor 60 having a shaft to which secured is a motor sprocket 62. The power of the motor 60 is transmitted to a step sprocket 70 through a driving chain 64. The step sprocket 70 is mounted on a common axis with a handrail sprocket 80 for a simultaneous rotation therewith. The handrail sprocket 80 is connected through a first handrail chain 82 to a handrail-driving mechanism 90 to drive the latter. The handrail-driving mechanism 90 is firmly secured to the supporting member 50 of the truss frame 20. Reference numeral 100 denotes idlers for the handrail chain 82, while numeral 110 denotes guide rollers for the moving handrail.

Figure 2:
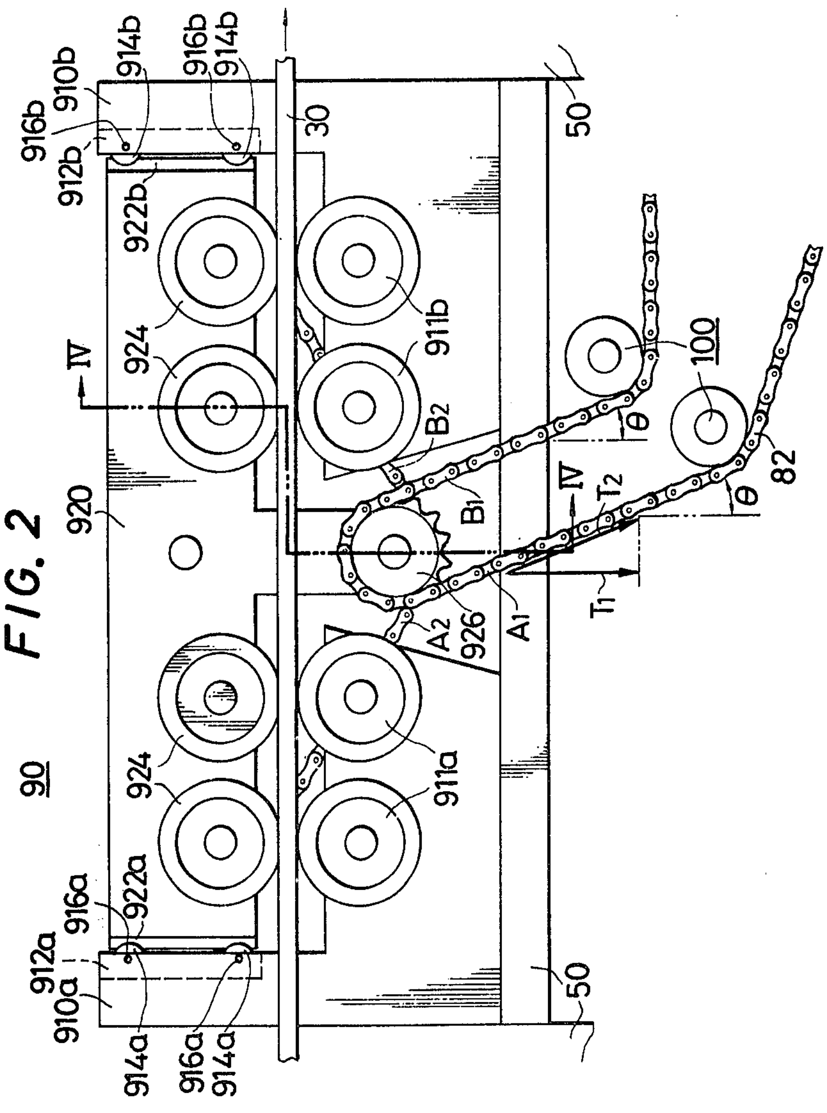
FIGS. 2 and 3 are side elevational views of a handrail-driving mechanism in accordance with a first embodiment of the invention, as viewed from both sides thereof.

As will be seen from FIG. 2, the handrail-driving mechanism is constituted by L-shaped fixed plates 910*a*, 910*b* and a T-shaped movable plate 920. The fixed plates 910*a* and 910*b* are strongly secured to the supporting members 50 of the truss frame 20 by means of, for example, welding.

These fixed plates 910*a* and 910*b* have respective guide rollers 911*a* and 911*b* rotatably mounted thereon with two rollers on each fixed plate 910*a*, 910*b*. These guide rollers 911*a*, 911*b* carry the movable handrail 30.

Figure 5:
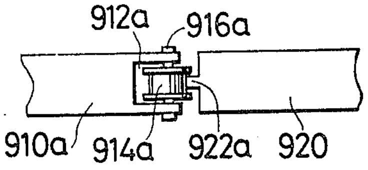
FIG. 5 is a top plan view of a part of the handrail-driving mechanism as shown in FIGS. 2 and 3.

Projections 922*a* and 922*b* are formed at both sides of the movable plate 920. These projections 922*a* and 922*b* are mounted on grooved rollers 914*a* and 914*b* secured to the grooves 912*a* and 912*b* formed at the sides of the fixed plates 910*a* and 910*b*. Therefore, the movable plate 920 is able to move in the vertical direction as viewed on the drawings. Reference numerals 916*a* and 916*b* denote pins for retaining grooved rollers 914*a* and 914*b*, respectively. FIG. 5 shows one end of the movable plate 920.

Disposed above the movable handrail 30 at the T-shaped movable plate 920, referring to FIG. 2, are four driving rollers 924. These driving rollers are so disposed so to confront a corresponding one of the four guiding rollers 911*a* and 911*b* carried by the fixed plates 910*a* and 910*b*, with the movable handrail 30 disposed therebetween. A driving sprocket 926 is disposed beneath the movable plate 920. The driving sprocket 926 is disposed beneath the movable handrail 30 and on a plane common to the driving roller 924 and the guiding rollers 911*a* and 911*b* (see-dot-and-dash line X—X of FIG. 4). At the same time, the driving sprocket 926 is located at the center of the movable plate 920. The aforementioned first handrail chain 82 goes around the driving sprocket 926 at an angle of $\theta$ (FIG. 2) to the vertical direction.

Figure 4:
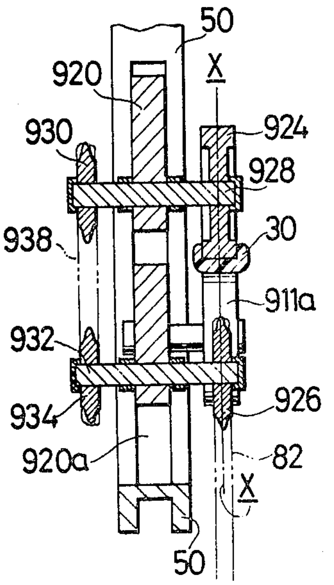
FIG. 4 is a sectional view of the handrail driving mechanism of FIGS. 2 and 3, taken along the line IV—IV.

As will be seen also from FIG. 4, the four driving rollers 924 are secured to one end of respective shafts 928 (only one of which is shown) which pass through the movable plate 920. Sprockets 930 are carried by the other ends of these shafts 928, so as to be rotated simultaneously with the driving rollers 924. The driving sprocket 926 is attached to one end of a shaft 932 which passes through the movable plate 920. A transmission sprocket 934 is firmly secured to the other end of the shaft 932, so as to be rotated concurrently with the driving sprocket 926.

Figure 3:
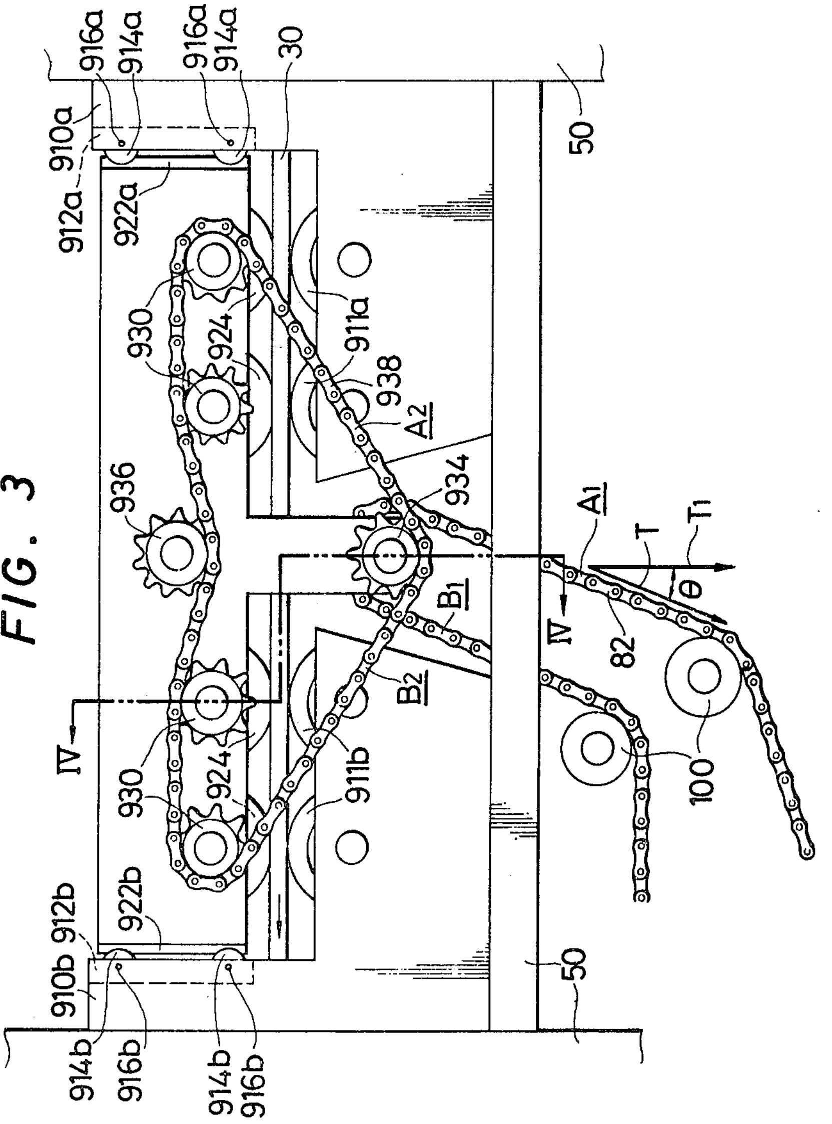

FIG. 3 shows the four sprockets 930 and the transmission sprocket 934. Reference numeral 936 denotes an adjusting sprocket for adjusting the slack of the chain. A second handrail chain engages these four sprockets 930, transmission sprocket 934 and the adjusting sprocket 936.

The handrail-driving mechanism 90 functions in the manner described more fully below.

At the time of starting of the escalator, the weights of the four driving rollers 924, movable plate 920, driving sprocket 926, four sprockets 930, transmission sprocket 934 and the adjusting sprocket 936 act to press the four driving rollers 924 onto the moving handrail 30. In, general, the friction coefficient between the driving rollers 924 and the moving handrail 30 is selected large enough to cause a large driving power on the moving handrail 30 when the driving rollers 924 are actuated in proportion to the friction coefficient and to the force by which the moving handrail 30 is clamped. Therefore, the load on the moving handrail 30 appears as a rotational resistance on the driving rollers 924, through the frictional force. At the same time, the rotational resistance by which respective driving rollers 924 are encountered appears as the rotational resistance on respective sprockets 930 which rotate concurrently with corresponding driving rollers 924.

The rotational resistance against the rotation of the sprockets 930 then assumes a form of tension residing in the second movable handrail chain 938, and is then transmitted to the transmission sprocket 934 as a rotational resistance acting on the latter. The rotational resistance on the transmission sprocket 934 is then changed into the rotational resistance acting on the driving sprockets 926, which then acts as a tension T residing in the first handrail chain 82. The tension T causes a force $T_1 = T \cos \theta$ acting on the movable plate 920 in the direction perpendicular to the latter to further press the driving rollers 924 onto the handrail 30. The frictional force exerted between the handrail 30 and the driving rollers 924 is increased as the clamping force on the handrail 30 increases to further increase the tension T in the same manner as described. This increases of the tension T of course further increase the clamping force. Thus, the increase of the clamping force is repeated in quite a short time, until the frictional driving force required for starting the moving handrail 30 is established. As a matter of fact, the moving handrail 30 is started almost concurrently with the start of the motor 60. FIGS. 2 and 3 shows the tension T, as well as its vertical component $T_1$. The arrow in these Figures represents the direction in which the moving handrail 30 operates.

Once started, the moving handrail 30 runs at a predetermined speed in the manner described below.

The driving sprocket 926 is rotated by the first moving handrail chain 82. Consequently, the transmission sprocket 934 adapted for unitary rotation with the driving sprocket 926 is rotated. The rotation of the transmission sprocket 934 is transmitted to four sprockets 930 through the second handrail chain 938. The rotation of these four sprockets 930 is then transmitted to a respective one of the four driving rollers 924 which in turn drives the moving handrail 30.

When the escalator is stopped, the motor 60 is stopped by, for example, an electromagnet brake, causing the first handrail chain 82 to stop. At that instant, tensions remain in the first and the second handrail chains 82 and 938 at the stretched side $A_1$ and $A_2$ (FIG. 3) of these chains.

Since certain slacks have been imparted to these chains 82 and 938, there is no tension left in the other or non-stretched sides $B_1$, $B_2$ (FIG. 3) of the chains. Therefore, due to the residual tension left in these chains, 82, 938 the moving handrail is slightly moved in the direction in which it has been moved, so as to release the residual tension in the first and the second handrail chains 82 and 938, so that the downward depressing vertical component $T_1$ of the tension T in the first handrail chain 82, which has depressed the movable plate 920 downwardly, is extinguished. Consequently, the movable plate 920 is returned to the state it was in prior to the start of the escalator.

Although the operation of the driving mechanism has been described only for the movement of the handrail 30 in the direction of the arrow, it will be seen that the handrail 30 can be driven in the counter direction in the same manner as described.

In the driving mechanism described above, since the driving sprocket 926 is placed under the moving handrail 30, the handrail 30 is fairly prevented from being contaminated by oil dripping from the driving sprocket 926 or from the first handrail chain 82.

At the same time, since the driving sprocket 926 is placed on the vertical plane X—X (shown in dot-and-dash line in FIG. 4.) of the driving rollers 924, the driving rollers 924 are pressed onto the handrail 30 a right angle thereto, by the vertical component $T_1$ of the tension T residing in the first handrail chain 82. This is effective to prevent the movable plate 920 from declining in the direction of thickness. At the same time, the inclination of the movable plate 920 in the directions of breadth is avoided by locating the driving sprocket 926 on the bisector line of the breadth or width movable plate 920, i.e., on the center line of the four driving rollers 924.

The smooth vertical movement of the movable plate 920 is ensured by these structural features.

Referring again to FIG. 2, the vertical component $T_1 = T \cos \theta$ can be adjusted by suitably selecting the angle $\theta$ at which the first handrail chain 82 intersects the vertical line, through changing the position of a pair of idlers 100. For instance, the idlers 100 are so positioned as to define the angle $\theta$, when the length of the escalator is large enough to require a large frictional driving power to withstand the increased load of the handrail 30.

Figure 6:
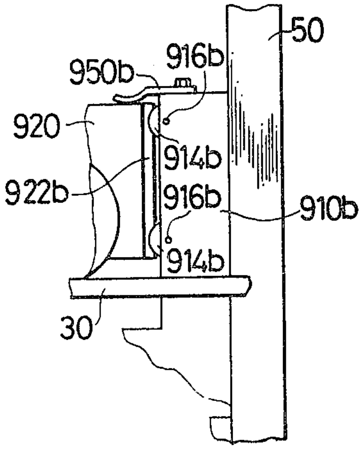
FIG. 6 shows a modification of the handrail-driving mechanism of FIGS. 2 and 3.

In a modification as shown in FIG. 6, leaf springs 950*a* and 950*b* are secured to the upper ends of the fixed plates 910*a* and 910*b*, respectively. In FIG. 6, only one plate 910*b* of the fixed plates 910*a*, 910*b* and associated leaf spring 950*b* are shown. Reference numeral 952 denotes a screw for fixing the leaf spring 950*b* to the fixed plate 920. These leaf springs 950*a* and 950*b* are effective to resiliently bias the movable plate 920 downwardly, so as to increase the clamping force exerted by the driving rollers 924 on the handrail 30. This modification is effective to prevent the slipping of the driving rollers 924 at the time of starting of the escalator, which is attributable to the small the weight of movable parts including the sprockets and rollers.

In the foregoing embodiment, the sprocket 930 of the driving roller 924 is driven through the first and the second handrail chains 82 and 938. However, it is possible to drive the driving roller 924 by making the first handrail chain 82 directly engage the sprocket 930.

Figure 7:
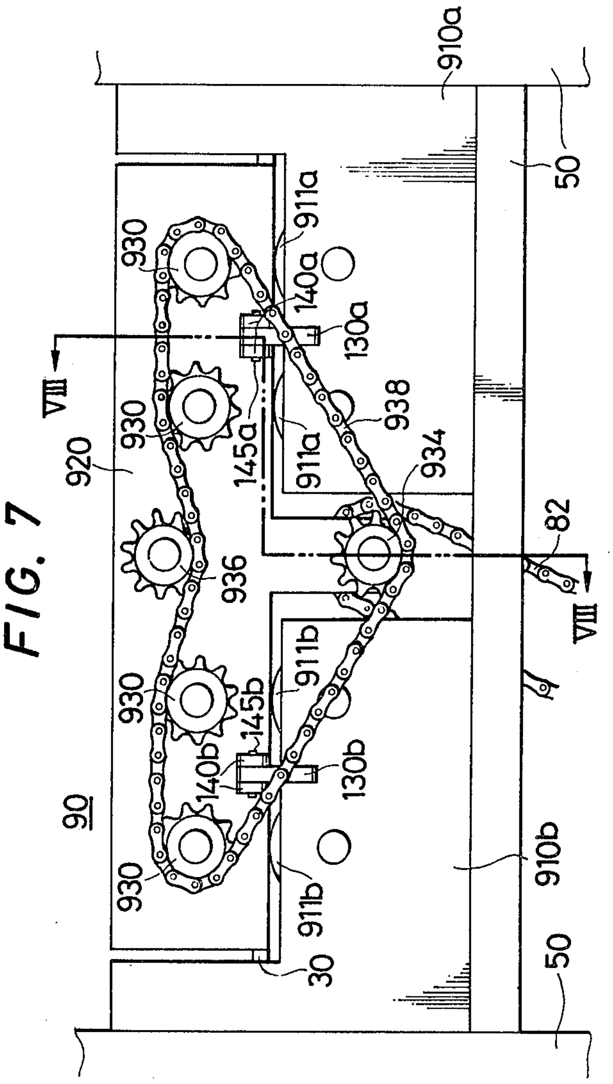
FIG. 7 shows a handrail-driving mechanism in accordance with another embodiment of the invention.
Figure 8:
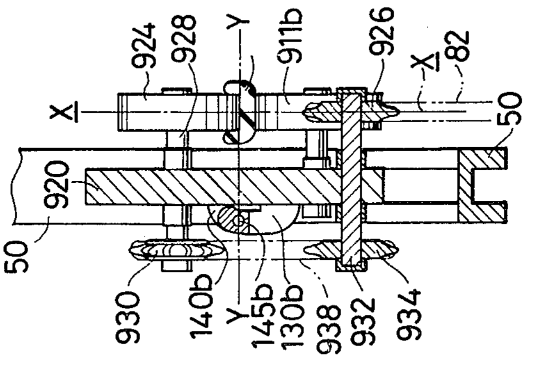
FIG. 8 is a cross-sectional view of the hand-rail driving mechanism of FIG. 7, taken along the line VII—VII.

FIG. 7 shows another embodiment of the invention, in which the same reference numerals denote the same parts as those in FIG. 2. The driving mechanism 90 of this embodiment is characterized in that the movable plate 920 is secured to the fixed plates 910*a* and 910*b* for a pivotal movement around a certain point. As will be seen also from FIG. 8, arms 130*a* and 130*b* are formed unitarily with the fixed plates 910*a* and 910*b*, respectively, and extend upwardly.

These arms 130*a* and 130*b* are received by U-shaped grooves 140*a* and 140*b* formed unitarily with the movable plate 920, and are retained by pivot pins 145*a* and 145*b*. As shown also in FIG. 8, the pivot pins 145*a* and 145*b* are provided on the plane Y—Y at which the driving rollers 924 contact the moving handrail 30. The peripheral surfaces of the driving rollers 924 are so designed as to be in parallel with the peripheral surfaces of the guiding rollers 911*a* and 911*b*, when they are in contact with the moving handrail 30. Other parts, with the exception of the grooves 912*a* and 912*b* formed in the fixed plates 911*a* and 911*b*, grooved rollers 914*a* and 914*b*, and projections 922*a* and 922*b* of the movable plate 920, are constructed in the same manner as those in FIGS. 2 and 3.

The driving mechanism of the embodiment of FIG. 7 drives the moving handrail 30 in the same manner as that of FIGS. 2 and 3. Due to the provision of pivot pins 145*a* and 145*b* on the plane at which the driving rollers 924 contact the moving handrail 30, the driving rollers 924 are pressed onto the moving handrail 30 at an equal pressing force. At the same time, the inclination of the driving rollers 924 with respect to the inclination of the movable plate 920 can be diminished by making the distance between the support pins 145*a*, 145*b* and the driving rollers 924 as small as possible. This arrangement is effective to diminish the local contact of each driving roller 924 attributable to the inclination of the driving roller 924. In a practical driving mechanism, the local contact of the driving roller 924 seldom occurs, because each driving roller 924 is pressed by a pressing force which is as large as about 100 Kg, during operation of the escalator.

Figure 9:
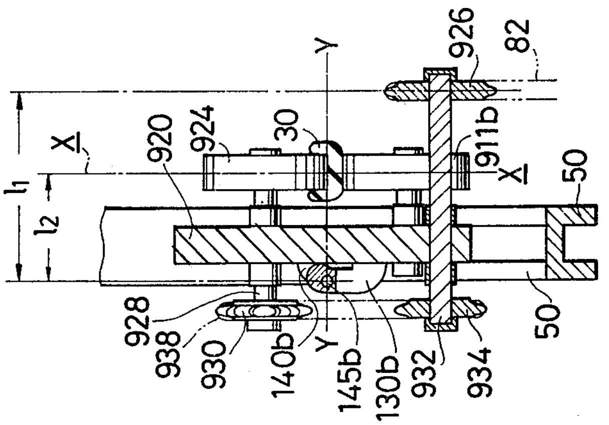
FIG. 9 is a cross-sectional view of a modification of the handrail-driving mechanism illustrated in FIG. 7.

In a modification as shown in FIG. 9, the horizontal distance $l_1$ between the driving sprocket 926 and the pivot pins 145*a*,145*b* (only one pin 145*b* is shown in FIG. 9) is selected to be greater than the distance $l_2$ between the driving rollers 924 and the pivot pins 145*a*,145*b*. Therefore, for instance, four driving rollers 924 as a whole can be pressed onto the moving handrail 30, at a force of $l_1/l_2\,T_1$ derived from the vertical component $T_1$ of the tension T residing in the first handrail chain T. At the same time, the clamping force exerted by the driving rollers 924 on the moving handrail 30 can be adjusted by suitably selecting the distance $l_1$ between the driving sprocket 926 and the pivot pins 145*a* and 145*b*. This modification is particularly useful in cases where the moving handrail 30 has to be driven by a relatively small capacity of motor 60, or where the load provided by the moving handrail 30 is specifically large.

Turning again to FIG. 8, the left-hand side of the movable plate 920 can have a spring to increase the clamping force exerted by the driving rollers 924 on the moving handrail 30. Such a provision of the spring is recommended particularly in case where the total weight of the movable plate 920 including the attachments is too small.

It will be seen from the foregoing description that the clamping force exerted by the driving rollers 924 on the moving handrail 30 is greatly decreased during the suspension of the escalator, because only the weight of the movable plate 920 including its mountings is applied to the moving handrail 30, so that almost no indentation is formed on the surface of the moving handrail 30 by the driving rollers 924 and guide rollers 911*a*,911*b*, even when the operation of the escalator is suspended for a long period of time.

The four driving rollers 924 may have belts made of an elastic material such as rubber, so that the tendency of generation of indentations on the handrail surface may further be decreased.

The combination of the chains and sprockets as used in the foregoing two embodiments can be replaced with a combination of belts and rollers.

The handrail-driving mechanism of the invention as described is highly compact and, therefore is suitable for use particularly in escalators having full transparent ledger boards.

What is claimed is:

1. A driving mechanism for driving a movable handrail comprising:

guiding rollers on which said moving handrail runs;

means for rotatably and stationarily supporting said guiding rollers;

driving rollers disposed to confront said guiding rollers with said moving handrail interposed therebetween, so as to drive said moving handrail by means of frictional force exerted between said driving rollers and said moving handrail;

means for rotatably supporting said driving rollers and capable of moving relatively to said means for supporting said guiding rollers; and transmission means for transmitting driving power to said driving rollers, said transmission means being arranged so as to displace said means for supporting said driving rollers in a direction toward said handrail so that a tension generated by the transmission means by the frictional force between said driving rollers and said handrail acts to increase the force at which said driving rollers contact said moving handrail, whereby the force is increased only when the driving mechanism is operated.

2. A driving mechanism for driving a moving handrail as claimed in claim 1, characterized in that said means for supporting said driving rollers are secured to said means for supporting said guiding rollers through pivot points provided on the latter for free rotation around an axis of said pivot points which is parallel to said handrail, whereby said means for supporting said driving rollers are pivoted around said pivot point to put said driving rollers into stronger contact with said moving handrail.

3. A driving mechanism for driving a moving handrail as claimed in claim 1, wherein the tension of said transmission means is applied to approximately a center of said means for supporting said driving rollers.

4. A driving mechanism for driving a moving handrail as claimed in claim 3, wherein the portion of said means for supporting said driving rollers at which said tension is applied is located under said moving handrail.

5. A driving mechanism for driving a moving handrail as claimed in claim 2, wherein the tension in said transmission mechanism is applied approximately to a center of said means for supporting said driving rollers.

6. A driving mechanism for driving a moving handrail as claimed in claim 2, wherein the portion of said means for supporting said driving rollers at which said tension is applied is located under said moving handrail.

7. A driving mechanism for driving a moving handrail as claimed in claim 2, wherein the distance between the driving roller and its pivot point is smaller than that between the portion of said means for supporting said driving rollers at which said tension is applied and the pivot point associated with said portion.

8. A driving mechanism for driving a moving handrail as claimed in claim 1, wherein resilient means are provided for biasing said driving rollers toward said moving handrail.

9. An arrangement for driving a movable handrail, the arrangement comprising:

means disposed in proximity of a run of the movable handrail for guiding a movement of the handrail, means for rotatably but stationarily supporting the guide means relative to the handrail, drive roller means disposed oppositely said guide means with the handrail interposed therebetween for driving said handrail by a friction force exerted between said guide means and said drive roller means, means for rotatably supporting said drive roller means, means for mounting said drive roller means supporting means so as to be movable relative to said supporting means for said guide means, and means for transmitting a driving power to said drive roller means, said transmitting means being arranged so as to displace said supporting means for said drive roller means in a direction toward the handrail so that a tension generated by the transmission means between the drive roller means and the handrail acts to increase a force at which said driving means contacts the handrail whereby the force is increased only when the driving power is applied to said drive roller.

10. An arrangement according to claim 9, wherein said supporting means for said guide means includes a pair of fixed plates adapted to be secured to a fixed support, and wherein said means for mounting said drive roller means includes means provided on said fixed plates for guiding a movement of said supporting means for said drive roller means relative to said fixed plates.

11. An arrangement according to claim 10, wherein said supporting means for said drive roller means includes a movable plate, and means are provided on said movable plate for maintaining said movable plate at said guiding means of said pair of fixed plates.

12. An arrangement for driving a movable handrail, the arrangement comprising:

means disposed in proximity of a run of the movable handrail for guiding a movement of the handrail, means for rotatably but stationarily supporting the guide means relative to the handrail including a pair of fixed plates adapted to be secured to a fixed support, drive roller means disposed oppositely said guide means with the handrail interposed therebetween for driving said handrail by a friction force exerted between said guide means and said drive roller means, means for rotatably supporting said drive roller means including a movable plate, means for mounting said drive roller supporting means so as to be movable relative to said supporting means for said guide means including means provided on said fixed plates for guiding a movement of said supporting means for said drive roller means relative to said fixed plates, means provided on said movable plate for maintaining said movable plate at said guiding means of said pair of fixed plates including at least one projection provided at lateral edges of said movable plates, said guiding means of said fixed plates including grooved roller means provided at each of the fixed plates for accommodating said projections of said movable plate, and means for transmitting a driving power to said drive roller means and for biasing said supporting means for said drive roller means in a direction toward the handrail so as to increase a force at which said driving means contacts the handrail.

13. An arrangement according to claim 12, wherein each of said fixed plates has an L-shaped configuration, as viewed in a side elevational view, and said movable plate has a T-shaped configuration, as viewed in a side elevational view, said fixed plates being disposed so as to accommodate therebetween a stem of the T-shaped movable plate.

14. An arrangement according to claim 13, wherein said transmitting and biasing means includes a drive sprocket rotatably disposed on the stem of the movable plate at a position below the movable handrail, a drive chain means disposed between said drive sprocket and a drive source, a transmission sprocket connected to the drive sprocket, additional sprocket means connected to said driving means, an adjusting means, and a further chain disposed between the transmission sprocket additional sprocket means, and adjusting means.

15. An arrangement according to claim 14, wherein said drive roller means includes a plurality of drive rollers rotatably mounted in a cross piece of the T-shaped movable plate, and wherein said adjusting means is constructed as an adjusting sprocket.

16. An arrangement for driving a movable handrail, the arrangement comprising:

means disposed in proximity of a run of the movable handrail for guiding a movement of the handrail, means for rotatably but stationarily supporting the guide means relative to the handrail including a pair of fixed plates adapted to be secured to a fixed support, drive roller means disposed oppositely said guide means with the handrail interposed therebetween for driving said handrail by a friction force exerted between said guide means and said drive roller means, means for rotatably supporting said drive roller means including a movable plate, means for mounting said drive roller means supporting means so as to be movable relative to said supporting means for said guide means including means provided on said fixed plates for guiding a movement of said supporting means for said drive roller means relative to said fixed plates, means provided on said movable plate for maintaining said movable plate at said guiding means of said pair of fixed plates, means for transmitting a driving power to said drive roller means and for biasing said supporting means for said drive roller means in a direction toward the handrail so as to increase a force at which said driving means contacts the handrail, and means for resiliently urging the movable plate in a direction toward the fixed plates.

17. An arrangement according to claim 16, wherein said maintaining means includes at least one projection provided at lateral edges of said movable plate, and wherein said guiding means of said pair of fixed plates includes grooved roller means provided at each of the fixed plates for accommodating said projections.

18. An arrangement according to claim 9, wherein said supporting means for said guide means includes a pair of fixed plates adapted to be secured to a fixed support, and said supporting means for said drive roller means is a movable plate, and wherein said means for mounting said drive roller means supporting means includes means for pivotally mounting the movable plate at said fixed plates.

19. An arrangement according to claim 18, wherein said means for pivotally mounting includes at least one pivot arm provided on each of said fixed plates, and pivot pin means for pivotally connecting the movable plate to a free end of each of the pivot arms.

20. An arrangement according to claim 19, wherein said pivot pins are disposed in a plane in which the drive roller means contact the handrail,

21. An arrangement for driving a movable handrail, the arrangement comprising:

means disposed in proximity of a run of the movable handrail for guiding a movement of the handrail, means for rotatably but stationarily supporting the guide means relative to the handrail including a pair of fixed plates adapted to be secured to a fixed support, drive roller means disposed oppositely said guide means with the handrail interposed therebetween for driving said handrail by a friction force exerted between said guide means and said drive roller means, means for rotatably supporting said drive roller means including a movable plate, means for mounting said drive roller means supporting means so as to be movable relative to said supporting means for said guide means including means for pivotally mounting the movable plate at said fixed plates, said means for pivotally mounting including at least one pivot arm provided on each of said fixed plates, and pivot pin means for pivotally connecting the movable plate to a free end of each of the pivot arms, means for transmitting a driving power to said drive roller means and for biasing said supporting means for said drive roller means in a direction toward the handrail so as to increase a force at which said driving means contacts the handrail, and wherein each of said fixed plates has an L-shaped configuration, as viewed in a side elevational view, and said movable plate has a T-shaped configuration, as viewed in a side elevational view, said fixed plates being disposed so as to accommodate therebetween a stem of the T-shaped movable plate.

22. An arrangement according to claim 21, wherein said transmitting and biasing means includes a drive sprocket rotatably disposed on the stem of the movable plate at a position below the movable handrail, a drive chain means disposed between said drive sprocket and a drive source, a transmission sprocket connected to the drive sprocket, additional sprocket means connected to said driving means, an adjusting means, and a further chain disposed between the transmission sprocket additional sprocket means, and adjusting means.

23. An arrangement according to claim 22, wherein said drive roller means includes a plurality of drive rollers rotatably mounted in a cross piece of the T-shaped movable plate, and wherein said adjusting means is constructed as an adjusting sprocket.

24. An arrangement according to claim 23, wherein a horizontal distance between the driving sprocket and the pivot pins is greater than a horizontal distance between the drive rollers and the pivot pins.

* * * * *